Figure 1:
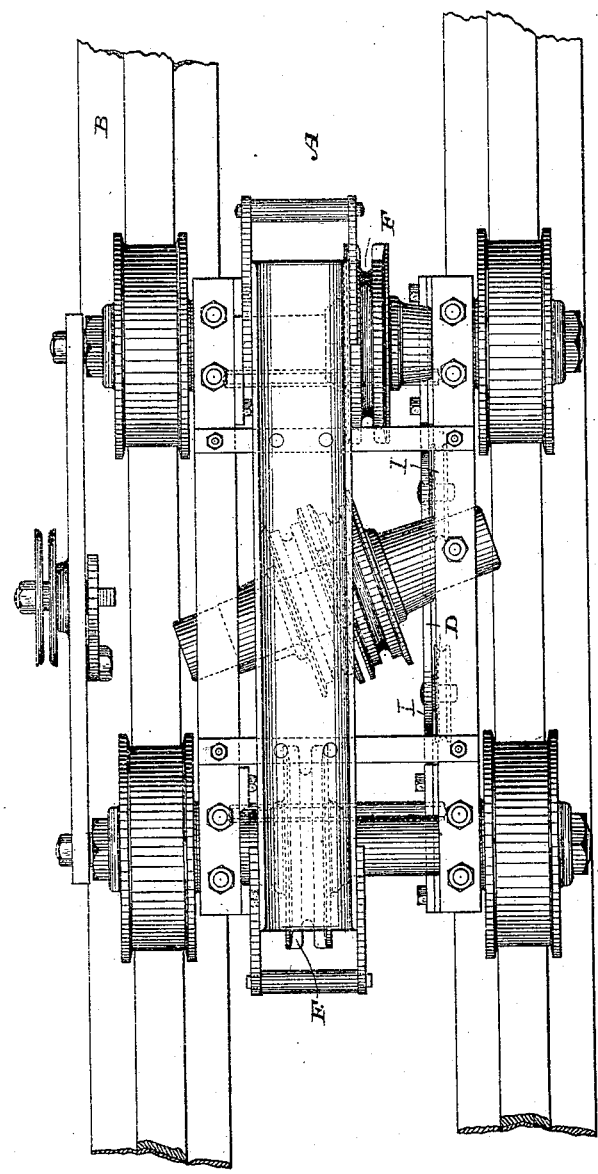

(No Model.)  3 Sheets—Sheet 1.

T. A. WESTON.
BRAKE MECHANISM FOR A TROLLEY OF A CRANE.

No. 272,608. Patented Feb. 20, 1883.

WITNESSES
Wm A. Skinkle
Francis D. Shoemaker

INVENTOR
Thomas A. Weston
By his Attorneys
Baldwin, Hopkins & Peyton.

(No Model.) 3 Sheets—Sheet 2.
T. A. WESTON.
BRAKE MECHANISM FOR A TROLLEY OF A CRANE.
No. 272,608. Patented Feb. 20, 1883.
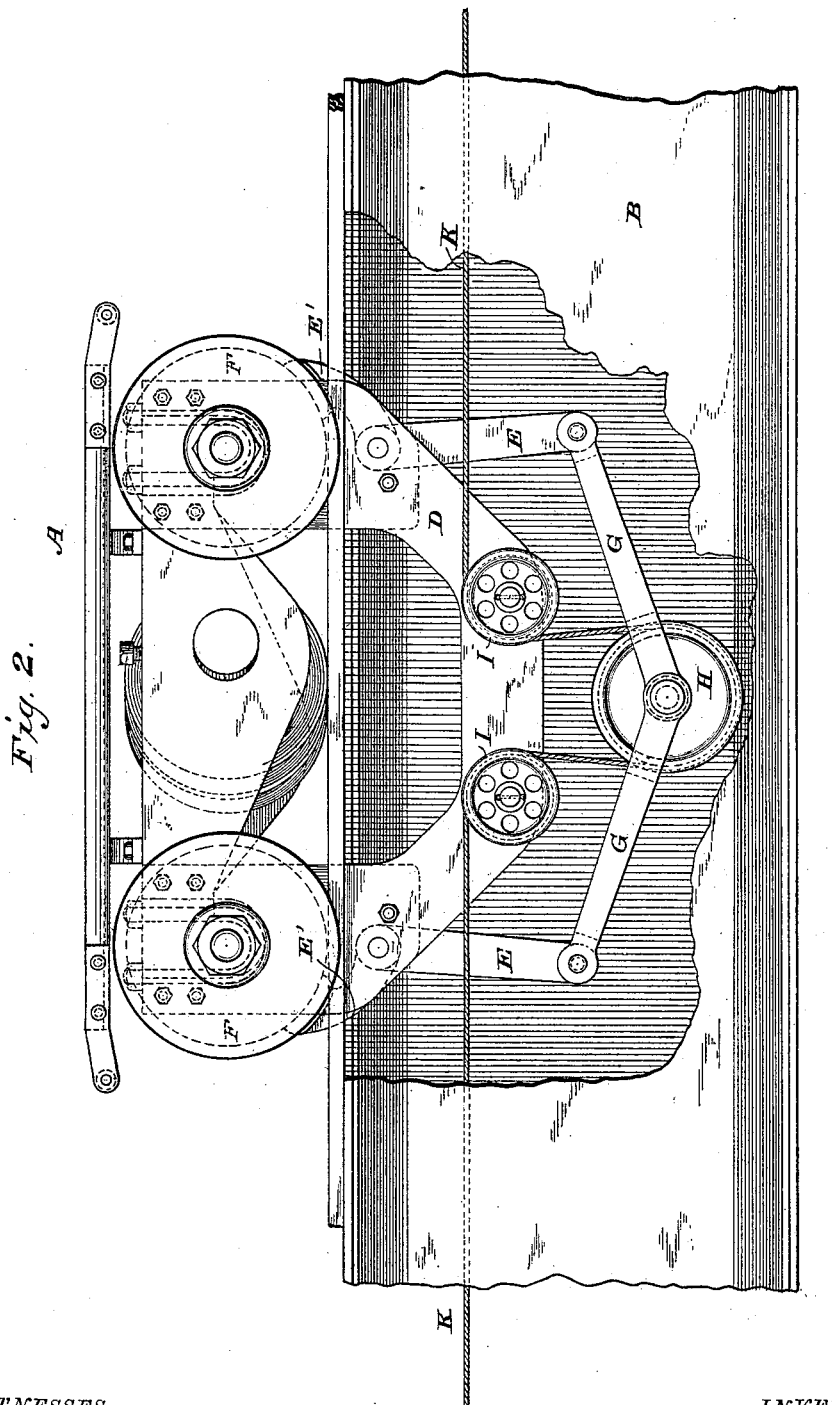
WITNESSES
Wm A. Skinkle
Francis D. Shoemaker
INVENTOR
Thomas A. Weston
By his Attorneys
Baldwin, Hopkins, & Peyton (No Model.) 3 Sheets—Sheet 3.
T. A. WESTON.
BRAKE MECHANISM FOR A TROLLEY OF A CRANE.
No. 272,608. Patented Feb. 20, 1883.
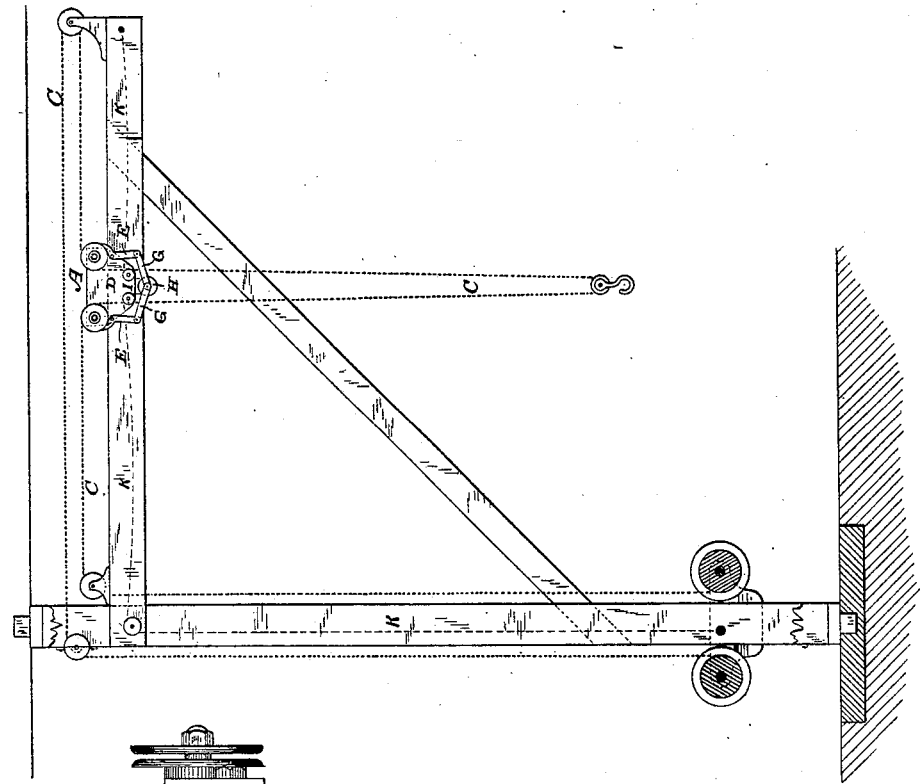
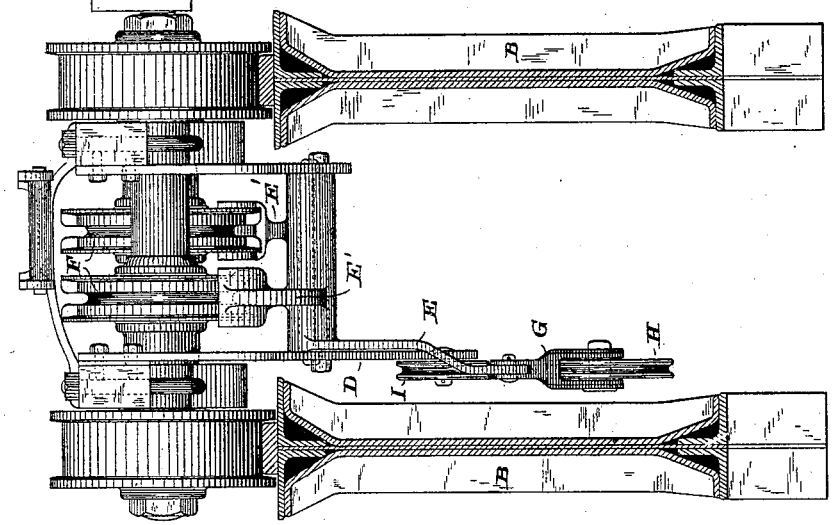
WITNESSES
Wm A. Skinkle
Francis D. Shoemaker
INVENTOR
Thomas A. Weston.
By his Attorneys
Baldwin, Hopkins, & Peyton

UNITED STATES PATENT OFFICE.

THOMAS A. WESTON, OF STAMFORD, CONNECTICUT, ASSIGNOR TO THE YALE LOCK MANUFACTURING COMPANY, OF SAME PLACE.

BRAKE MECHANISM FOR A TROLLEY OF A CRANE.

SPECIFICATION forming part of Letters Patent No. 272,608, dated February 20, 1883.

Application filed January 11, 1883. (No model.)

*To all whom it may concern:*

Be it known that I, THOMAS A. WESTON, of Stamford, in the county of Fairfield and State of Connecticut, have invented a certain Improved Brake Mechanism for a Trolley of a Crane, of which the following is a specification.

In traveling cranes, such as that shown in my United States Patent No. 198,718, and in jib-cranes, such as that shown in the United States Patent of Thomas W. Capen, No. 242,271, in which the movement of a trolley is accomplished by means of an endless chain, there is a liability, especially when there is no load on, that the endless chain, which should cause the trolley to travel, will slip over the sheaves and fail to move the trolley.

The object of my invention is to overcome this difficulty, and accordingly I provide a peculiar brake attachment which will lock the sheaves, so that slipping of the chain and failure of the trolley to travel will be prevented.

In the accompanying drawings, illustrating my invention, Figure 1 is a plan view of a trolley of a traveling crane. Fig. 2 is a side elevation of the same, with one of the bridge-beams broken away so as to show my brake mechanism. Fig. 3 is an end view of a trolley upon its bridge, with my improvements attached. Fig. 4 is an outline view of a jib-crane and trolley with my improvements applied.

In view of the patents above specified and the well-known state of the art, it will only be necessary to describe in detail so much of the devices shown in the drawings as constitutes my brake mechanism.

Referring to the letters upon the drawings, A indicates the trolley; B, the bridge-rails upon which it travels, and C the endless chain which causes its movements to and fro.

D indicates a bracket secured to the bottom of the trolley in any suitable way, to which are pivoted two bell-crank levers, E, the short arms, E', of which have suitable brake-surfaces to bear against the chain-sheaves F. To the lower ends of the long arms of these bell-crank levers are pivoted two links, G, which again are pivoted at their opposite ends to the axis of a loose wheel, H.

I I indicate two guide-pulleys loosely journaled to the bracket D.

K indicates a pull-rope or cable fixed at one end and loose at the other.

From the foregoing description it will now be understood that by pulling upon the rope K, by means of a lever or otherwise, at the loose end the wheel H will be raised, the links G elevated at their lower ends and caused to operate as toggle-levers to push outward the long arms of the bell-crank levers and cause the brake-surfaces of their short arms to bear upon the sheaves F. The sheaves will thus be locked, and the chain cannot slip over them in consequence of the pockets with which they are provided, and hence no failure of the trolley to travel can occur. This brake mechanism is applicable to any crane on which a trolley travels on a track or bridge by means of an endless chain, and when applied does not at all interfere with the free motion of the trolley on the bridge in either direction.

It will be noticed that the construction of the brake mechanism, and the relations to it of its operating rope K, are such that the trolley may travel freely within the limits of its movement in either direction, and yet at every point the rope may be pulled and the brake effectively applied at will.

Instead of having two bell-crank levers and brakes, one may be dispensed with and one of the links G pivoted at its outer end to a pivoted link or strap connected with the trolley or with the bracket, merely for the purpose of supporting the outer end of the link G. It would also be practicable, by making the short arm of the bell-crank lever bear on the inner face of the trolley-wheel, to dispense with the links G and extend an angle of the long arm of the bell-crank lever downward to furnish the support for the loose wheel H. Therefore I do not intend to limit my invention to the precise form and arrangement of parts herein shown and described; but,

Having thus described my invention, what I claim, and desire to secure by Letters Patent of the United States, is—

1. In combination with the trolley of a crane, a brake mechanism, and a pull-rope, secured at one end and loose at the other for permitting the traverse of the trolley in either direction, and for operating the brake mechanism at any point, substantially as set forth.

2. The combination, with the trolley, of the bracket D, the bell-crank lever, forming a brake at one end and a support either mediately or immediately for the loose wheel H at the other end, and the pull-rope K, substantially as set forth.

3. The combination, with the trolley, of the bracket D, the bell-crank levers E, the links G, the wheel H, the pulleys I, and the pull-rope K, substantially as set forth.

In testimony whereof I have hereunto subscribed my name this 22d day of December, A. D. 1882.

THOMAS A. WESTON.

Witnesses:
J. C. PERRY,
26 *Lee Crescent, Birmingham, county of Warwick, England.*
C. G. SHURSFIELD,
*Charlemont, Wednesbury, county of Stafford, England.*